United States Patent
Fan et al.

(10) Patent No.: US 9,413,863 B1
(45) Date of Patent: Aug. 9, 2016

(54) VIDEO PHONE WITH VIEWING STAND

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yong-Chang Fan, Wuhan (CN); San-Yong Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipai (TW)

( * ) Notice: Subject to any disclaimer, the term of this patent is extended or adjusted under 35 U.S.C. 154(b) by 0 days.

(21) Appl. No.: 14/792,169

(22) Filed: Jul. 6, 2015

(30) Foreign Application Priority Data

May 13, 2015 (CN) .......................... 2015 1 0241645

(51) Int. Cl.
*H04M 1/00* (2006.01)
*H04M 1/12* (2006.01)
*H04N 7/14* (2006.01)

(52) U.S. Cl.
CPC ............... *H04M 1/12* (2013.01); *H04N 7/142* (2013.01)

(58) Field of Classification Search
CPC ........... H04M 1/12; H04M 1/04; H04M 1/11; H04M 1/6075; F16M 11/00; F16M 11/06
USPC ............................ 379/436, 447; 248/371, 393
See application file for complete search history.

(56) References Cited

U.S. PATENT DOCUMENTS

| 6,665,175 | B1 * | 12/2003 | deBoer | G06F 1/162 248/920 |
|---|---|---|---|---|
| 2012/0262853 | A1 * | 10/2012 | Sung | F16M 11/10 361/679.01 |
| 2014/0139987 | A1 * | 5/2014 | Onda | G06F 1/16 361/679.02 |
| 2014/0285150 | A1 * | 9/2014 | Toh | H04M 1/04 320/115 |
| 2015/0382491 | A1 * | 12/2015 | Ye | F16M 11/06 248/457 |

* cited by examiner

*Primary Examiner* — Tuan D Nguyen
(74) *Attorney, Agent, or Firm* — ScienBiziP, P.C.

(57) ABSTRACT

A video phone with a viewing stand includes a main portion and a base to be secured to the main portion. Each side of the main portion defines a sliding groove and includes a limiting column. Each end of the base is equipped with a positioning column and a block. The positioning column is configured to be inserted into the sliding groove and to slide in the sliding groove to drive the main portion from a horizontal position to a vertical position or vice versa. The block is configured to slide into a first position to allow the main portion to be in the horizontal position, or in a second position to resist against the limiting column to allow the main portion to be in the vertical position.

19 Claims, 6 Drawing Sheets

VIDEO PHONE WITH VIEWING STAND

CROSS-REFERENCE TO RELATED APPLICATIONS

This application claims priority to Chinese Patent Application No. 201510241645.9 filed on May 13, 2015, the contents of which are incorporated by reference herein.

FIELD

The subject matter herein generally relates to telephones, and more particularly to a video phone.

BACKGROUND

In the structure of the existing video phone, a flip type structure opens the screen. When the screen is packed, the phone can not be used which makes it inconvenient to people.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
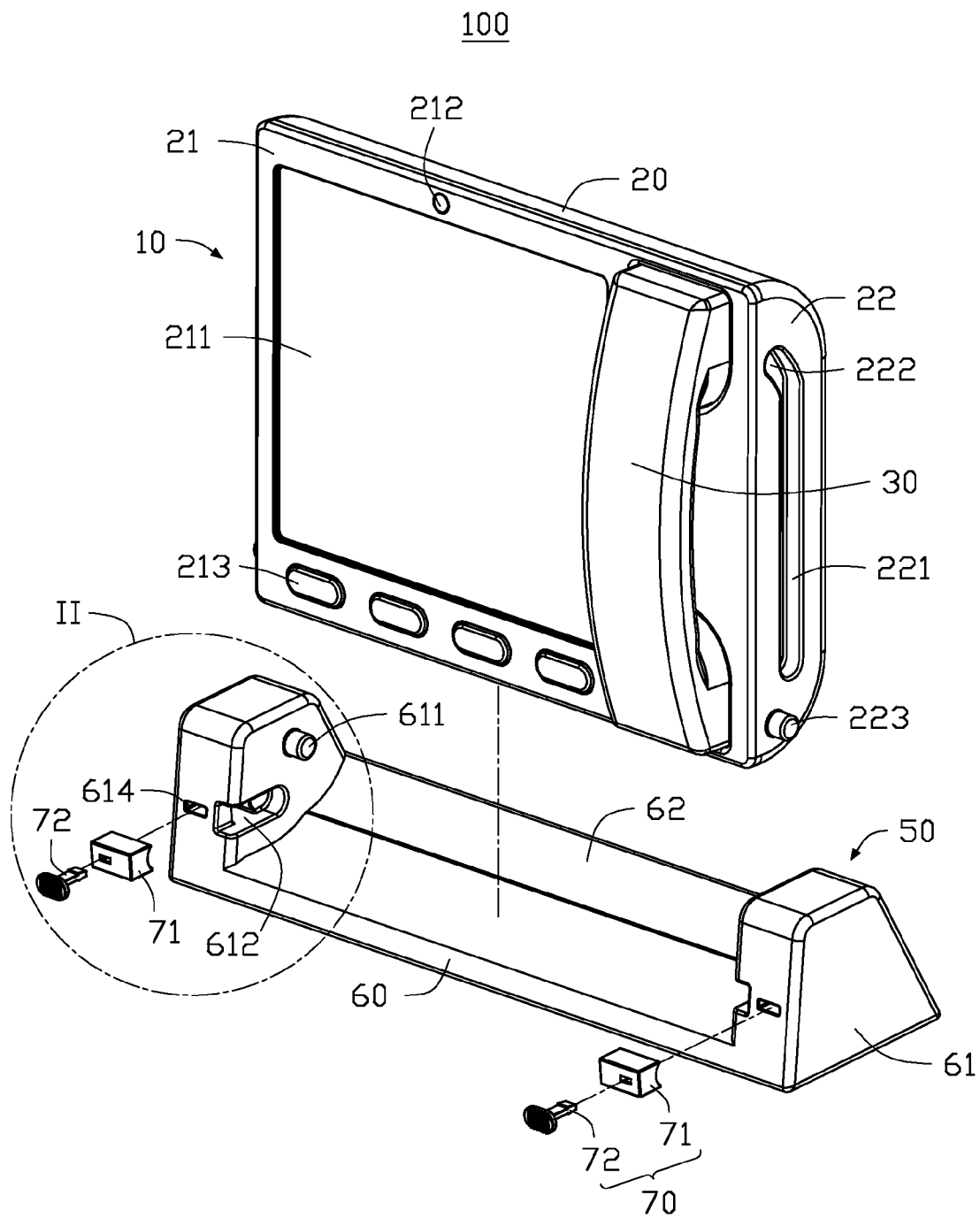
FIG. 1 is an isometric, exploded view of an embodiment of a video phone.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising" when utilized, means "including, but not necessarily limited to"; it specifically indicates open-ended inclusion or membership in the so-described combination, group, series and the like.

Figure 2:
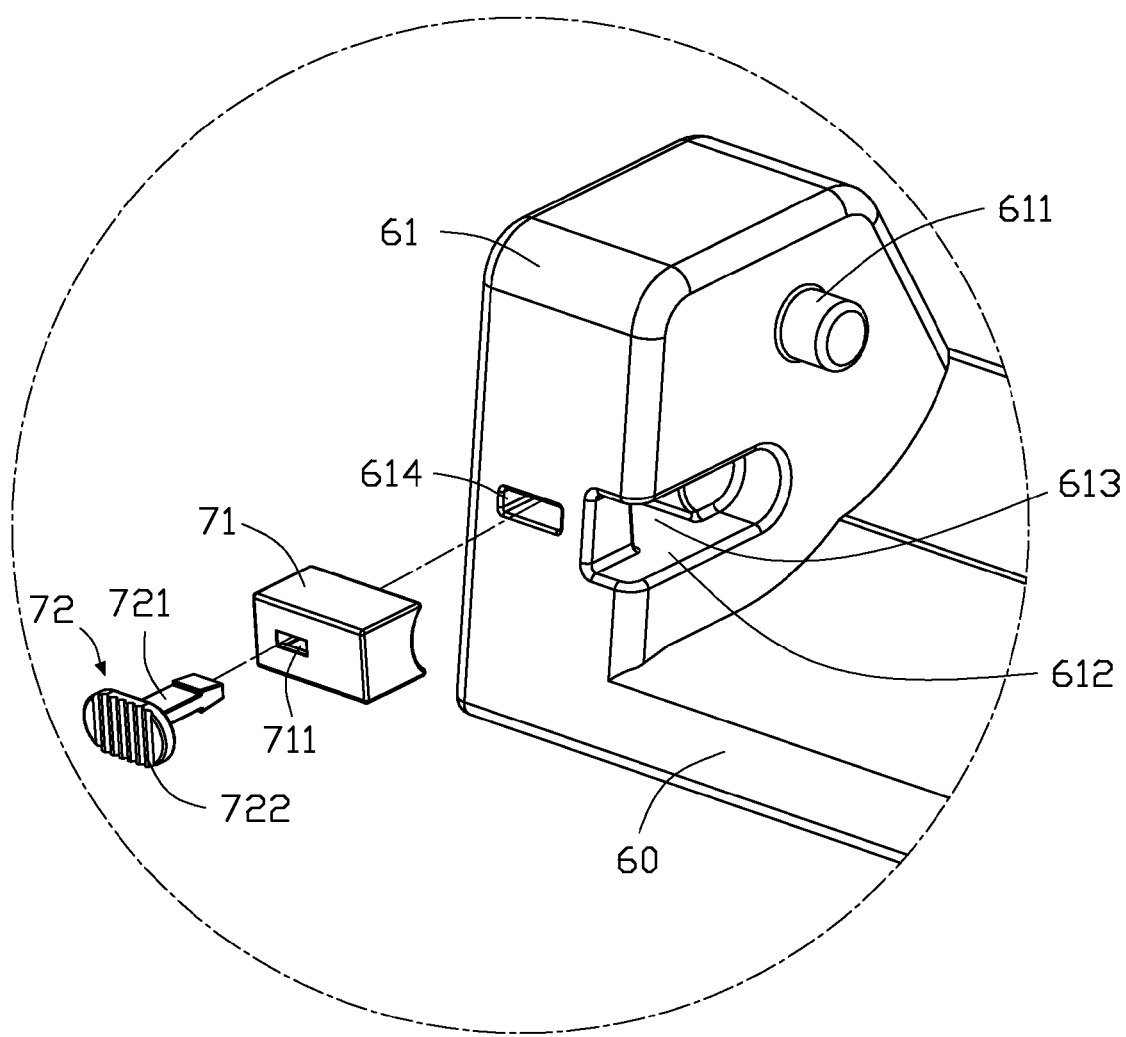
FIG. 2 is an enlarged, isometric view of encircled portion II of FIG. 1.
Figure 3:
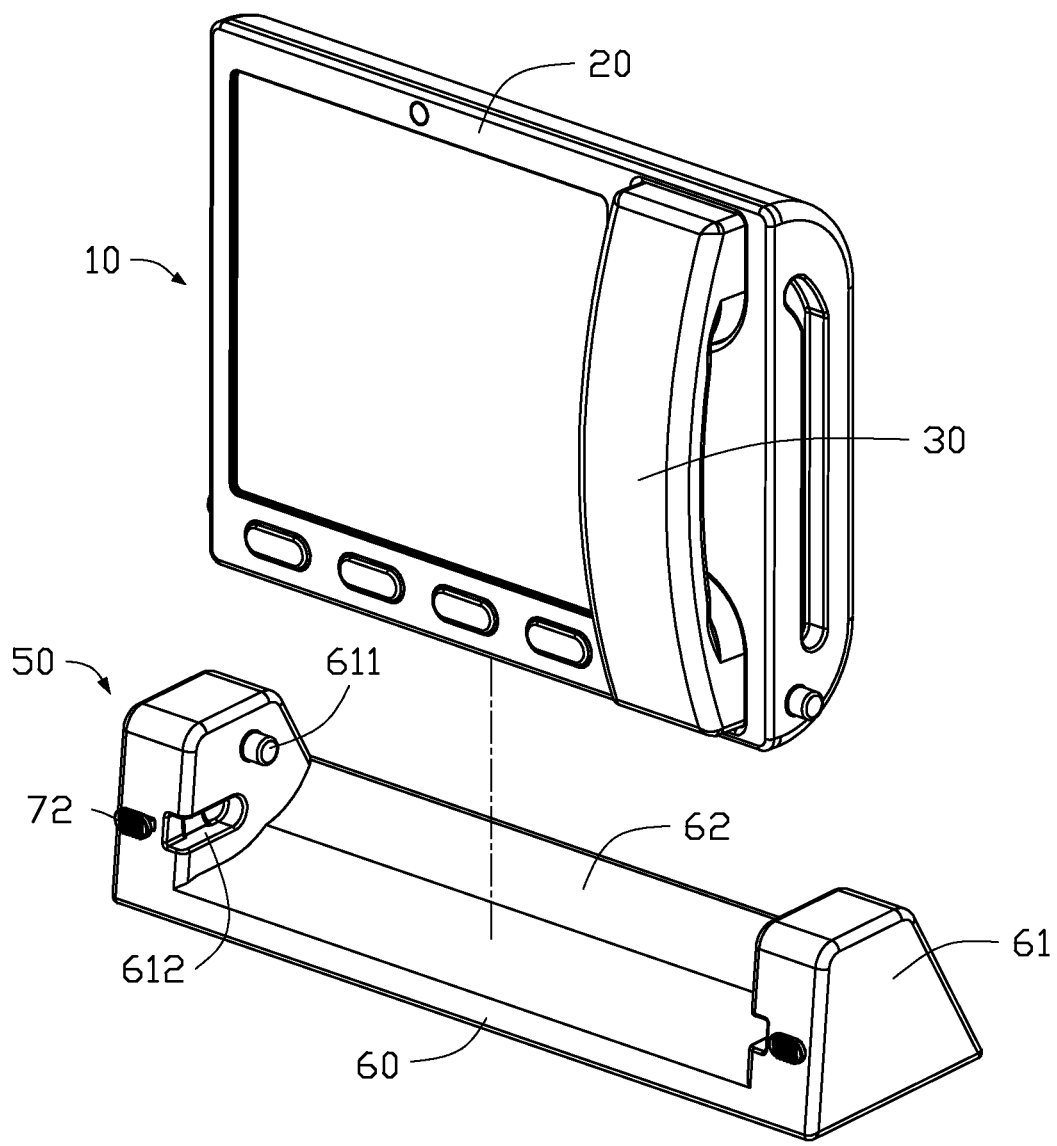
FIG. 3 is an isometric, exploded view of a main portion and a base of the video phone of FIG. 1.
Figure 4:
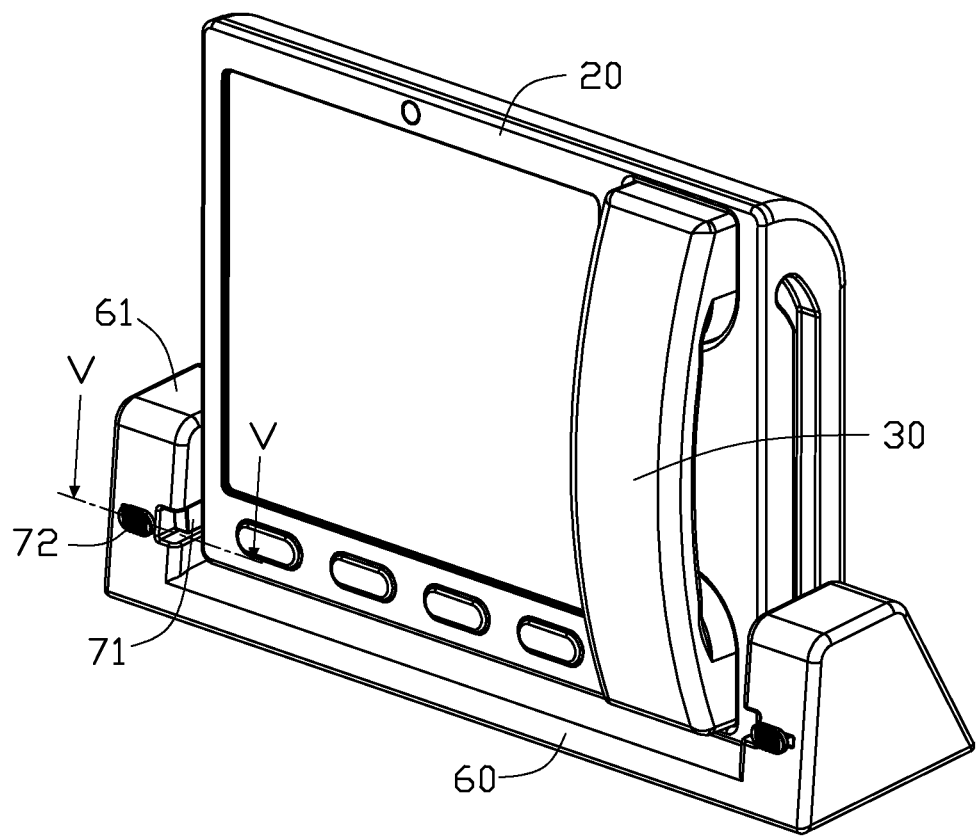
FIG. 4 is an isometric, assembled view of the main portion of the encircled portion II of FIG. 2, showing the main portion in a vertical position.
Figure 5:
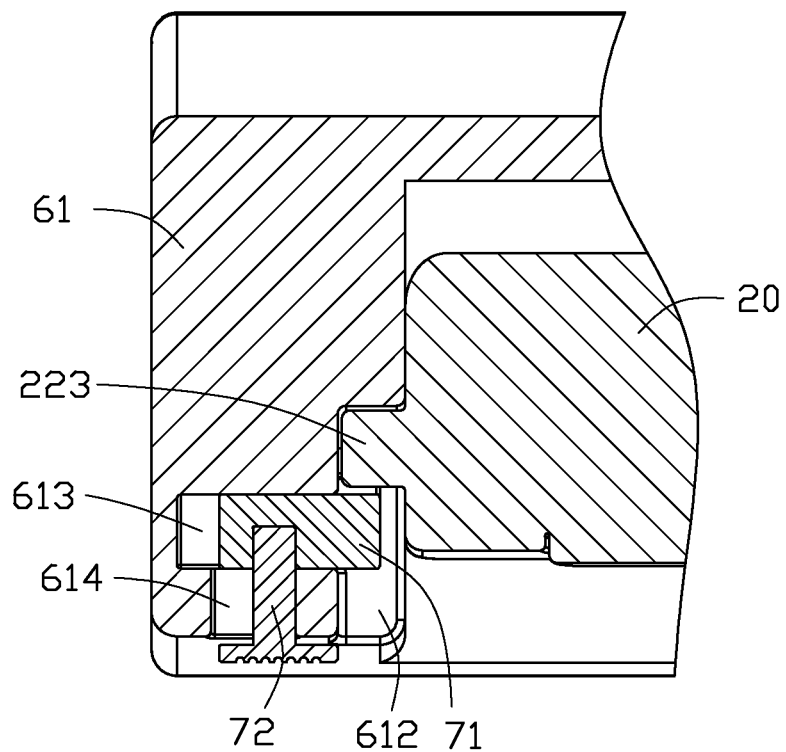
FIG. 5 is a cross sectional view of line V-V of FIG. 4.
Figure 6:
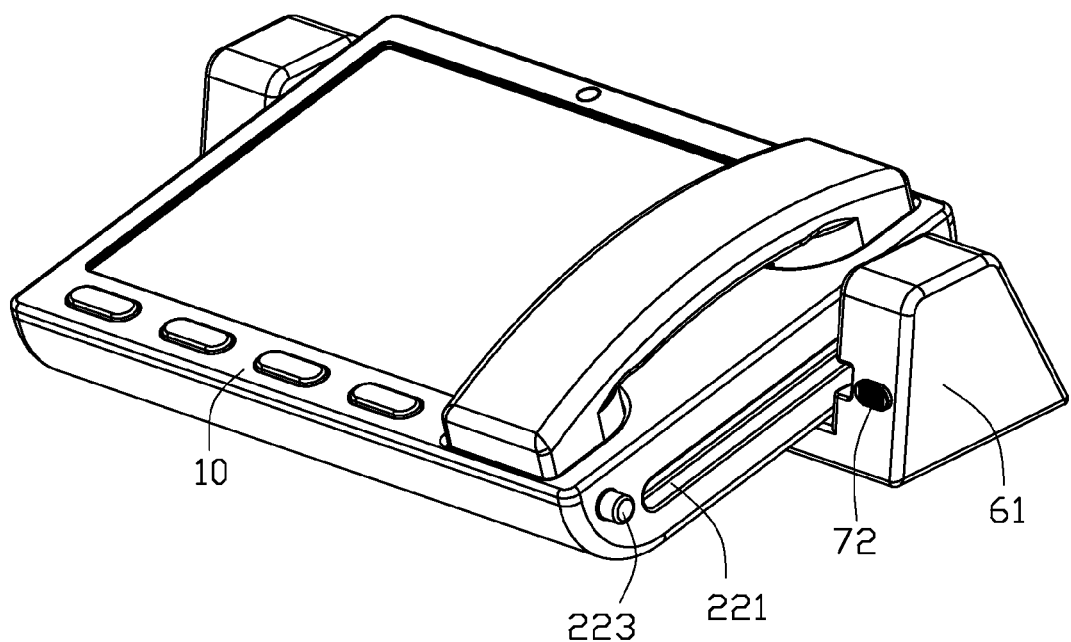
FIG. 6 is similar to FIG. 4, but showing the main portion in a horizontal position.

FIGS. 1 and 2 illustrate one embodiment of a video phone 100. The video phone 100 includes a main portion 10 and a base 50 secured the main portion 10.

The main portion 10 includes a body 20 and a receiver 30. The body 20 includes a panel 21. The panel 21 includes a touch panel 211, a camera 212, and a plurality of buttons 213. The body 20 includes two side plates 22. Each side plate 22 defines a sliding groove 221. One end of the sliding groove 221 is equipped with a receiving portion 222. A limiting column 223 is located on the side plate 22 adjacent to one end of the sliding groove 221. The receiver 30 is placed on the panel 21.

The base 50 includes a base plate 60 and two securing modules 70 secured on the base plate 60. Each end of the base plate 60 is equipped with a bracket 61. A receiving space 62 is located between the two brackets 61. The bracket 61 is equipped with a positioning column 611 and defines a receiving groove 612. A cavity 613 is located within the bracket 61. One end of the cavity 613 communicates with the receiving groove 612. The bracket 61 defines a through hole 614 communicating with the cavity 613.

The securing module 70 includes a block 71 and a sliding member 72 which is configured to be fixed on the block 71. One side of the block 71 defines a securing hole 711. The sliding member 72 includes a sliding pole 721 and a sliding plate 722 communicating with the sliding pole 721. The sliding pole 722 is configured to be inserted into the securing hole 711 to fix the block 71 on the sliding member 72.

FIGS. 3 to 6 illustrate assembly, when the block 71 is placed in the cavity 613 and the securing hole 711 is aligned with the through hole 614. The sliding pole 721 passes through the through hole 614 and is inserted into the securing hole 711. Then, the securing module 70 is mounted on the base plate 60. The sliding member 72 is slidable in the through hole 614 to slide the block 71 between a first position and a second position. When the block 71 is in the first position, the block 71 is wholly received in the cavity 613. When the block 71 is in the second position, one part of the block 71 is received in the cavity 613 and another part of the block 71 is received in the receiving groove 612.

The receiver 30 is placed on the body 20 and the main portion 10 is placed in the receiving space 62 of the base 50. The positioning column 611 is inserted into the sliding groove 221. The video phone 100 is thus completely assembled.

The positioning column 611 slides into the receiving portion 222 of the sliding groove 221. The block 71 slides into the first position and the video phone 100 is in a horizontal position. When the positioning column 611 slides into another end of the sliding groove 221, the limiting column 223 is received in the receiving groove 612. The sliding plate 722 drives the block 71 to slide into the second position. The block 71 can resist against the limiting column 223 to prevent the limiting column 612 sliding out of the receiving groove 612. The video phone 100 is then in a vertical position.

The embodiments shown and described above are only examples. Many details are often found in the art such as the other features of a video phone. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A video phone comprising:
   a main portion comprising a plurality of sides, each of the plurality of sides defining a sliding groove and comprising a limiting column; and
   a base having two ends configured to secure the main portion, each of the two ends of the base comprising:
      a positioning column slidable relative to the main portion to be inserted into the sliding groove and drive the main portion moving between a horizontal position and a vertical position; and
      a block configured to slide into a first position to allow the main portion to be in the horizontal position or a second position to be resisted against the limiting column to allow the main portion to be in the vertical position.

2. The video phone of claim 1, wherein the end of the base is equipped with a bracket, the positioning column and the block are mounted on the bracket.

3. The video phone of claim 2, wherein a receiving space is defined between the two brackets, and the main portion is received in the receiving space.

4. The video phone of claim 2, wherein the bracket defines a receiving groove, when the main portion is in the vertical position, the limiting column is received in the receiving groove.

5. The video phone of claim 4, wherein the bracket defines a cavity, one end of the cavity is communicated with the receiving groove, and the block is configured to be slid in the cavity.

6. The video phone of claim 5, wherein the bracket comprises a sliding member, and the sliding member is secured on the block to drive the block sliding.

7. The video phone of claim 6, wherein the bracket defines a through hole communicated with the cavity, and the sliding member can pass through the through hole to communicate with the block.

8. The video phone of claim 7, wherein the block defines a securing hole, the sliding member can pass through the through hole and be inserted into the securing hole to be fixed on the block, and the sliding member can be slid in the through hole to drive the block sliding between in the first position and the second position.

9. The video phone of claim 1, wherein each side of the main portion comprises a side plate, the sliding groove and the limiting column are located on the side plate.

10. The video phone of claim 9, wherein one end of the sliding groove comprises a receiving portion, when the main portion is in the vertical position, the positioning column is received in the receiving portion.

11. A video phone, comprising:
    a main portion configured to communicate, each side of the main portion comprising a sliding groove and a limiting column;
    a base configured to secure the main portion, each side of the base comprising a bracket and each bracket comprising a positioning column and a receiving groove; and
    a block configured to be installed in the bracket;
    wherein the positioning column is slidable relative to the main portion to be inserted into the sliding groove and slide in the sliding groove to drive the main portion moving, the block is configured to slide into the receiving groove to resist against the limiting column and to secure the main portion.

12. The video phone of claim 11, wherein a receiving space is defined between the two brackets, the main portion is configured to be received in the receiving space.

13. The video phone of claim 12, wherein the bracket defines a receiving groove, and the limiting column is configured to be received in the receiving groove.

14. The video phone of claim 13, wherein the bracket defines a cavity, one end of the cavity is communicated with the receiving groove, and the block is configured to be slid in the cavity.

15. The video phone of claim 14, wherein the bracket comprises a sliding member, and the sliding member is secured on the block to drive the block sliding.

16. The video phone of claim 15, wherein the bracket defines a through hole communicated with the cavity, and the sliding member can pass through the through hole to communicate with the block.

17. The video phone of claim 16, wherein the block defines a securing hole, the sliding member can pass through the through hole and be inserted into the securing hole to be fixed on the block, and the sliding member can be slid in the through hole to drive the block sliding.

18. The video phone of claim 11, wherein each side of the main portion comprises a side plate, the sliding groove and the limiting column are located on the side plate.

19. The video phone of claim 18, wherein one end of the sliding groove comprises a receiving portion, the positioning column is configured to be received in the receiving portion.

\* \* \* \* \*